(12) United States Patent
Takatori et al.

(10) Patent No.: US 8,442,915 B2
(45) Date of Patent: May 14, 2013

(54) MODIFIABLE AUTHENTICATION LEVELS IN AUTHENTICATION SYSTEMS FOR TRANSACTIONS

(75) Inventors: Sunao Takatori, Tokyo (JP); Hisanori Kiyomatsu, Tokyo (JP)

(73) Assignee: Daita Frontier Fund, LLC, Wilmington, DE (US)

( * ) Notice: Subject to any disclaimer, the term of this patent is extended or adjusted under 35 U.S.C. 154(b) by 0 days.

(21) Appl. No.: 13/350,302

(22) Filed: Jan. 13, 2012

(65) Prior Publication Data

US 2012/0109824 A1 May 3, 2012

Related U.S. Application Data

(62) Division of application No. 10/070,221, filed as application No. PCT/JP01/05597 on Jun. 28, 2001, now Pat. No. 8,117,444.

(30) Foreign Application Priority Data

Jun. 28, 2000 (JP) .................................. 2000-193957

(51) Int. Cl.
*G06Q 40/00* (2012.01)
(52) U.S. Cl.
USPC ........................................................... 705/44
(58) Field of Classification Search .................... 705/18, 705/44; 713/182; 455/406
See application file for complete search history.

(56) References Cited

U.S. PATENT DOCUMENTS

| | | | |
|---|---|---|---|
| 5,724,423 | A | 3/1998 | Khello |
| 5,914,472 | A | 6/1999 | Foladare et al. |
| 6,256,737 | B1 | 7/2001 | Bianco et al. |
| 6,282,658 | B2 | 8/2001 | French et al. |
| 6,321,339 | B1 | 11/2001 | French et al. |
| 6,496,936 | B1 | 12/2002 | French et al. |
| 6,516,056 | B1 | 2/2003 | Justice et al. |
| 6,529,881 | B2 * | 3/2003 | Morganstein et al. .......... 705/18 |
| 6,609,198 | B1 | 8/2003 | Wood et al. |
| 6,636,833 | B1 | 10/2003 | Flitcroft et al. |

(Continued)

FOREIGN PATENT DOCUMENTS

| | | |
|---|---|---|
| JP | 06-215009 A | 8/1994 |
| JP | 09-081519 A | 3/1997 |
| JP | 2000-076336 A | 3/2000 |
| JP | 2000-092236 A | 3/2000 |

OTHER PUBLICATIONS

International Search Report directed to related International Patent Application No. PCT/JP2001/04487, mailed Sep. 25, 2001; 1 page.

(Continued)

*Primary Examiner* — Samica L Norman
(74) *Attorney, Agent, or Firm* — Sterne, Kessler, Goldstein & Fox, P.L.L.C.

(57) ABSTRACT

A system and method are provided for authentication. A first request for a transaction is received from a communications device, the first request comprising collation information of a customer to be authenticated and a price of a product or service to be purchased by the customer. An authentication level is set based on the price. A second request is transmitted to a mobile communications device of the customer. Authentication information is received from the mobile communications device, the authentication information comprising identification information of the customer. The authentication information is transmitted to the communications device.

20 Claims, 6 Drawing Sheets

U.S. PATENT DOCUMENTS

| | | | |
|---|---|---|---|
| 6,892,307 B1 | 5/2005 | Wood et al. | |
| 7,050,993 B1 | 5/2006 | Piikivi et al. | |
| 7,086,085 B1 | 8/2006 | Brown et al. | |
| 7,096,003 B2 * | 8/2006 | Joao et al. | 455/406 |
| 7,110,987 B2 | 9/2006 | Engelhart | |
| 7,305,562 B1 | 12/2007 | Bianco et al. | |
| 7,571,142 B1 | 8/2009 | Flitcroft et al. | |
| 8,117,444 B2 | 2/2012 | Takatori et al. | |
| 2001/0001877 A1 * | 5/2001 | French et al. | 713/182 |
| 2003/0105960 A1 | 6/2003 | Takatori et al. | |

OTHER PUBLICATIONS

Non-Final Rejection mailed Jul. 6, 2007 for U.S. Appl. No. 10/070,221, filed Aug. 19, 2002; 17 pages.

Final Rejection mailed Feb. 21, 2008 for U.S. Appl. No. 10/070,221, filed Aug. 19, 2002; 18 pages.

Non-Final Rejection mailed Aug. 5, 2008 for U.S. Appl. No. 10/070,221, filed Aug. 19, 2002; 18 pages.

Final Rejection mailed Jan. 14, 2009 for U.S. Appl. No. 10/070,221, filed Aug. 19, 2002; 19 pages.

Non-Final Rejection mailed Jul. 17, 2009 for U.S. Appl. No. 10/070,221, filed Aug. 19, 2002; 22 pages.

Final Rejection mailed Oct. 26, 2010 for U.S. Appl. No. 10/070,221, filed Aug. 19, 2002; 27 pages.

Non-Final Rejection mailed May 11, 2011 for U.S. Appl. No. 10/070,221, filed Aug. 19, 2002; 22 pages.

Notice of Allowance mailed Oct. 4, 2011 for U.S. Appl. No. 10/070,221, filed Aug. 19, 2002; 11 pages.

International Search Report directed to related International Patent Application No. PCT/JP2001/05597, mailed Sep. 25, 2001; 1 page.

* cited by examiner

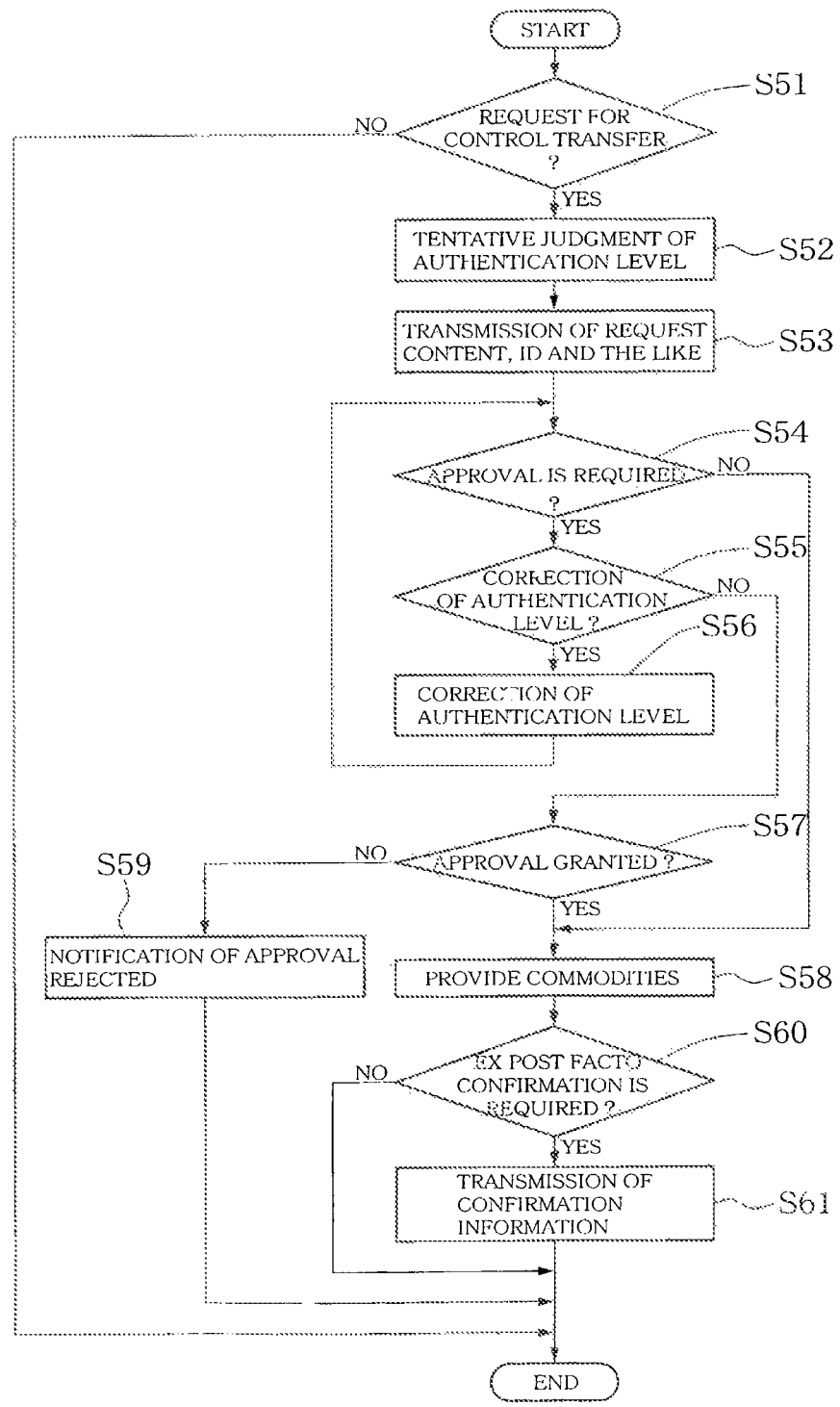

MODIFIABLE AUTHENTICATION LEVELS IN AUTHENTICATION SYSTEMS FOR TRANSACTIONS

CROSS REFERENCE TO RELATED APPLICATIONS

This application is a Divisional of U.S. application Ser. No. 10/070,221 filed on Aug. 19, 2002 by Takatori et al., which is a U.S. National Phase of PCT application PCT/JP01/05597, filed Jun. 28, 2001, which claims priority to JP Application No. 2000-193957, filed Jun. 28, 2000, which are all incorporated by reference herein in their entireties.

FIELD OF TECHNOLOGY

The present invention relates to a host computer, a mobile communication device, a program and a storage medium for the use in an authentication system for supplying various kinds of goods and services.

PRIOR ART

At present, the supply of various kinds of products, including services, via communications lines, such as the supply of Internet contents and transactions at Internet Malls, is rapidly spreading, and the terminals used therein range widely from the personal computer to mobile communication devices, to various kinds of home appliances. That is, it is quite likely that in future, the majority of electronic equipment, service devices, and other equipment will be provided with a function to purchase for-fee products via communications lines.

Moreover, with increasing popularity of financial services such as credit cards and the like, and there are increasingly diverse billing formats, and increased convenience for the consumer. These financial services are expected to be combined with mobile communication devices, such as mobile phones, to provide even greater levels of convenience, while, on the other hand, however, problems such as debit card forgery and theft have arisen.

The situation described above further increases the importance of authenticating customers who have purchased products. Nevertheless, convenience will suffer if complicated operations for authentication are required every time the equipment is used.

The present invention was invented in view of the above background and it is an object thereof is to provide an authentication system and a host computer, a mobile communication device, a program and a storage medium for the aforementioned system capable of achieving appropriate authenticating processing while guaranteeing the maximum convenience for the user, when various kinds of products and services are provided.

DISCLOSURE OF THE INVENTION

In order to achieve the above described object, a host computer as set forth in the present invention is characterized in that it comprises:

a first receiving means for receiving, from a service device, collation information that requests authentication of the party in question;

a second transmitting means for transmitting request information that requests information regarding the authentication to a mobile communication device in response to reception of collation information by said first receiving means;

a second storage means for storing information regarding the authentication of a plurality of persons;

a second receiving means for receiving information regarding authentication from aforementioned mobile communication device;

a comparing means for comparing information regarding the authentication received by said second receiving means with information regarding authentication stored in aforementioned second storage means; and a first transmitting means for transmitting authentication information that authenticates a party in question according to comparison results from said comparing means to the aforementioned service device.

Furthermore, the aforementioned information regarding the authentication is characterized in that it is ID information of a user or personal attributes of a user.

Furthermore, the aforementioned first receiving means is characterized in that it receives information regarding the services provided by the service device, and further comprises an authentication selecting means for selecting an authentication level according to the information regarding said services.

Furthermore, the aforementioned authentication selecting means compares the past service provision history with services to be provided at present and selects the authentication level based on a result of that comparison.

Furthermore, the aforementioned authentication selecting means is characterized in that it selects an authentication level based on at least any one of cost of service, service provision region, service provision frequency and a total sum of money for service provided.

Furthermore, in order to achieve the aforementioned object, the mobile communication device as set forth in the present invention is characterized in that it comprises:

a third receiving means for receiving, from the host computer, request information that requests information regarding authentication;

a first storage means for storing information regarding authentication; and a third transmitting means for transmitting information regarding authentication, stored in said first storage means, to the aforementioned host computer, in response to the reception of request information by the aforementioned third receiving means.

Furthermore, it is characterized in that it has a fourth transmitting means for transmitting information regarding authentication to the service device.

Furthermore, the aforementioned third transmitting means is characterized in that it selectively transmits, to the aforementioned host computer, the type of information regarding authentication requested by the aforementioned request information.

Furthermore, the function of the mobile communication device as set forth in the present invention can be also achieved by causing a computer to execute a program, and such a program can be loaded on a recording medium that can be read by a computer.

A method of authenticating by using the host computer and the mobile communication device as set forth in the present invention (hereinafter termed "the authentication method as set forth in the present invention") is based on both the communications between the first communication terminal built into the service device and the host computer, and the communications between the host computer and the mobile communication device (the second communication terminal). Higher reliability of authentication can be achieved thereby. In this way, when various kinds of products and services are provided, appropriate authentication processing can be achieved while guaranteeing maximum convenience for the customer.

Furthermore, in the authentication method as set forth in the present invention, in the communication between the host computer and the mobile communication device (the second communication terminal), the user may be asked for his ID information (identification information) or information regarding the personal attributes of the user, and authentication may be performed based on the response thereto.

Furthermore, in the service device as set forth in the present invention, a card reader for reading the information from the storage medium whereon the user's ID information is stored is further provided, and the service device can read the ID information of the storage medium, and the authentication method as set forth in the present invention is such that the first communication terminal transmits the ID information read by the card reader to the host computer, and the host computer notifies the mobile communication device (the second communication terminal) of the ID information based on this information and confirms the response of the mobile communication device (the second communication terminal) thereto. In this way, convenience and reliability can be increased, while using a conventional storage medium is used.

Furthermore, in the authentication method as set forth in the present invention, and in addition, in the communication between the host computer and the mobile communication device (the second communication terminal), the identifiable communication information between the first communication terminal and the mobile communication device (the second communication terminal) is notified to the mobile communication device, and this information is confirmed by comparison with the information necessary for authenticating a communication history, a control transfer history, or the like and the authentication is performed based on the confirmation result thereof. This enables a further increase in the reliability of authentication.

Furthermore, in the authentication method as set forth in the present invention, a plurality of authentication levels, and a control transfer permission condition relating to each authentication level, are stored in advance in the second storage means of the host computer or the third storage means of the service device so that an authentication level can be selected according to the object of the authentication when the user desires the authentication of the party in question. That is, the authentication level can be selected by comparing the past service provision history with the services to be provided at present.

Furthermore, in the authentication method as set forth in the present invention, when the object of the authentication is to purchase products, the products are compared with the price for the products and the past product purchase history, and the authentication level is selected based on the result of the comparison. Increased convenience can be achieved thereby.

Furthermore, in the present invention, the host computer may automatically analyze trends in product purchasing by the user and compare the analysis result with said products.

Furthermore, in the authentication method as set forth in the present invention, when the object of the authentication is to purchase a product, the authentication level can be selected based on at least any one of cost of service, service provision region, service provision frequency and a total sum of money for the service provided. Increased convenience can be achieved thereby.

Furthermore, in the present invention, the service device may be equipment capable of providing a product to the user and may provide the product after confirming a billing process for the user after the authentication of the person in question.

Furthermore, in the authentication method set forth in the present invention, the first communication terminal and the host computer are connected by a mobile communication line, and the host computer and the mobile communication device (the second communication terminal) are connected by the mobile communication line. The degree of freedom in the installation location, etc. of the first communication terminal is increased thereby.

Furthermore, in the authentication method set forth in the present invention, the first communication terminal and the host computer are connected by a fixed line, and the host computer and the mobile communication device (the second communication terminal) are connected by a mobile communication line. The communication reliability of the first communication terminal is increased thereby.

Furthermore, in the authentication method as set forth in the present invention, when a line condition is not good between the mobile communication device (the second communication terminal) and the host computer, communication that should be performed between the mobile communication device (the second communication terminal) and the host computer is executed between the first communication terminal and the host computer. Line problems can be handled easily thereby.

The descriptions in the specification and/or the drawings of Japanese Patent Application 2000-193957, which is the foundation for the priority of the present patent application, are incorporated [by reference] into the present specification.

BRIEF DESCRIPTION OF THE DRAWINGS

FIG. 7 is a flow chart illustrating the flow of adjustment of the authentication level in an authentication system as set forth in the present invention.

BEST MODE FOR CARRYING OUT THE INVENTION

Next, embodiments of authentication systems constituted using a host computer, a mobile communication device, a program, and a recording medium as set forth in the present invention (hereinafter termed "the authentication system as set forth in the present invention") will be described based on the drawings.

Figure 1:
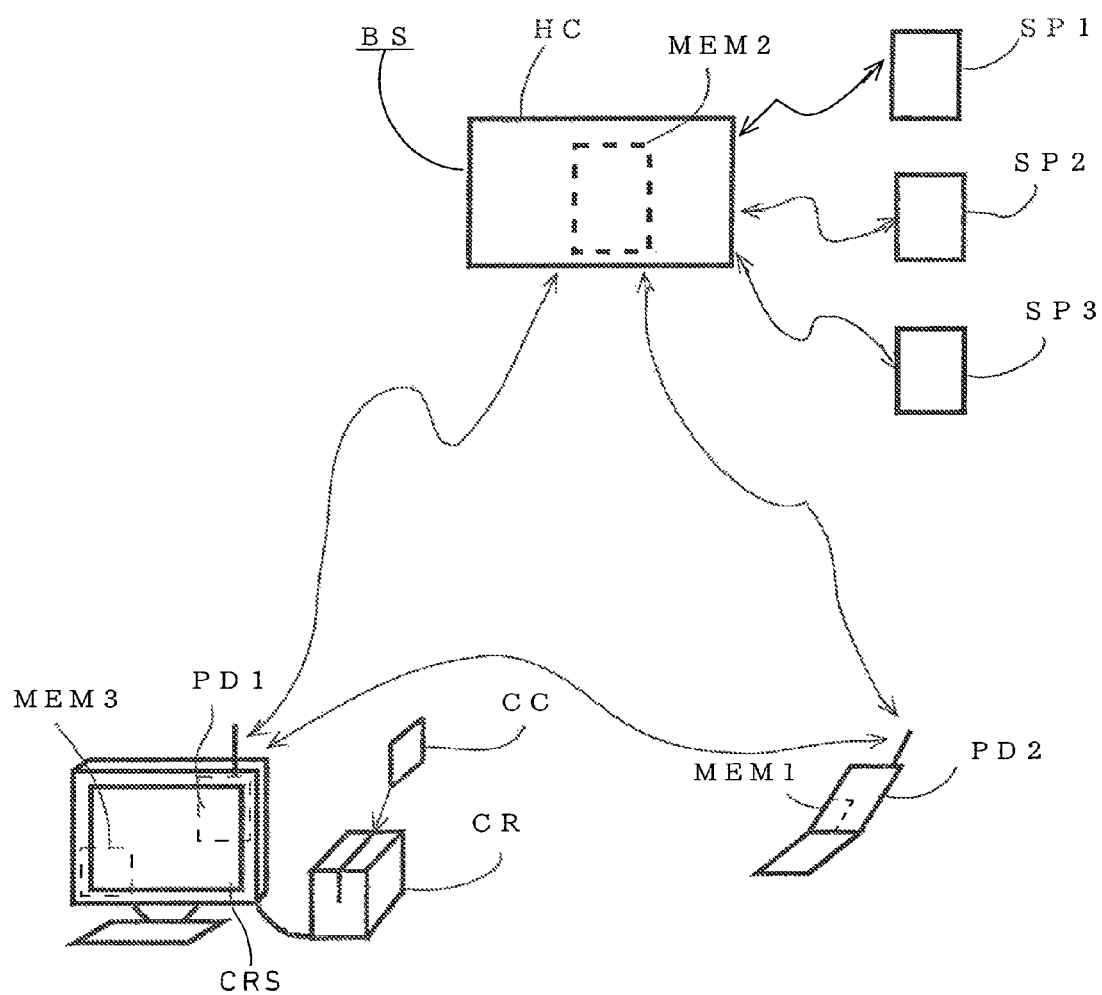
FIG. 1 is a block diagram illustrating the structure of a first embodiment of an authentication system as set forth in the present invention.

FIG. 1 illustrates a structure of a first embodiment of an authentication system as set forth in the present invention, illustrating an authentication system having a card reader system (CRS) for reading a storage medium (CC) for storing user ID information, such as a credit card. A card reader (CR) is connected to the card reader system CRS (service device), and the first communication terminal (PD1) (in this case, for mobile communication) of a built-in type (embedded type) is incorporated into the card reader system CRS, and the user (customer) can communicate with a host computer (HC) of an authentication control company (BS) through the first communication terminal PD1. The authentication control company BS is, for example, a communication service company, and performs the authentication control for a plurality of product supplier companies (SP1 to SP3) (and while three companies are shown in the drawing, the [actual] number is discretionary) according to product purchasing statuses in the card reader system CRS (service device). The product supplier companies SP1 to SP3 include not only service providing companies that provide services such as credit services, cash services, and the like, but also product supplier companies that provide various products, as shown in Table 1, via the Internet and, additionally, include financial institutions, securities companies, real estate companies, mass communication-related companies such as satellite broadcasting, cable television, newspapers, radio broadcasting, publishing and the like, and so forth.

Here, for convenience, processing devices of the product supplier companies SP1 to SP3 are also designated as SP1 to SP3. These processing devices SP1 to SP3 are connected to a host computer HC of the authentication control company BS via a public communication line or dedicated line.

TABLE 1

Examples of Provided Products
Provided Products

| | |
|---|---|
| Internet Contents | Product information, corporate information and other information provision services |
| | Music distribution services |
| | Book distribution services |
| | Game distribution services |
| | Services for providing image information such as photographs, paintings and the like |
| Internet mall, shopping channel | Various kinds of products, monetary notes |
| Finance | Internet banking |
| Securities | Brokerage of securities trading |
| Real estate | Brokerage of real estate trading |
| Mass Communication | Satellite broadcasting, cable television |
| | Newspapers, publication |
| | Radio |

The host computer HC comprises: a first receiving means for receiving the collation information for requesting an authentication of the person in question from the service device; a second transmitting means for transmitting request information for requesting information regarding authentication to a mobile communication device (PD2) (the second communication terminal; in this case, a portable telephone) in response to the reception of the collation information by the first receiving means; a second storage means (MEM2) for storing the information regarding the authentication of a plurality of persons; a second receiving means for receiving information regarding authentication from the mobile communication device (the second communication terminal); the comparison means for comparing information regarding authentication received by the second receiving means with information regarding authentication stored in the second storage means MEM2; and a first transmitting means for transmitting authentication information for authenticating the person in question to the service device according to the result of comparison by the comparison means.

Furthermore, the mobile communication device (the second communication terminal) PD2 comprises: a third receiving means for receiving the request information for requesting information regarding authentication from the host computer HC; a first storage means (MEM1) for storing information regarding authentication; and a third transmitting means for transmitting information regarding authentication stored in the first storage means MEM1 to the host computer HC in response to the reception of request information by the third receiving means.

An authentication method using a host computer HC and a mobile communication device (the second communication terminal) PD2 will be described next.

First, collation information for requesting the authentication of the party in question is transmitted from a first communication terminal PD1 of the service device (card reader system) CRS to a host computer HC.

When the host computer HC receives collation information, for requesting the authentication of the party in question, from the first communication terminal PD1 through a first receiving means, [this host computer HC] transmits request information, for requesting information regarding authentication, to a mobile communication device (a second communication terminal) PD2 through a second transmitting means in response to the reception of the collation information by the first transmitting means.

When the mobile communication device (the second communication terminal) PD2 receives request information, for requesting information regarding authentication from the host computer HC, through a third receiving means, [the mobile communication device (the second communication terminal) PD2] transmits information regarding authentication, which is stored in the first storage means MEM1, to the host computer HC through the third transmitting means in response to the reception of request information by the third receiving means.

When the host computer HC receives the information regarding authentication from the mobile communication device (the second communication terminal) PD2 through the second receiving means, [the host computer HC] compares the information regarding authentication received by the second receiving means with information regarding authentication stored in second storage means MEM2 through the use of comparing means, and transmits authentication information for authenticating the party in question to the first communication terminal PD1 of the service device (card reader system) CRS, through the first transmitting means, according to the query result.

While conventionally a signature by the user has been required when executing an authentication procedure as to whether or not the use of a storage medium CC is legal, in the present embodiment, in order to reduce the load on the user and to speed up authentication processing, when the use of the CC storage medium is communicated as the collation information to the host computer HC from the card reader system CRS, the host computer HC of the authentication control company BS communicates with the second communication terminal PD2 (mobile communication device, portable telephone) owned by the user and requests information regarding authentication (sends request information).

The second communication terminal PD2 is provided with the storage means MEM1 for storing the user ID information, and, in response to the request from the host computer HC, the user ID information (information regarding authentication) is read from the first storage means MEM1 and sent back to the host computer HC. When the host computer HC receives the user ID information from PD2, [the host computer HC] compares the ID information with information regarding authentication stored in second storage means MEM2 through the use of comparing means. If the use of the storage medium CC is legal, the authentication of the party in question is established and the reliability of the authentication can be increased thereby.

Conversely, the host computer HC accumulates in advance, in the second storing means MEM2, information regarding the personal attributes of the user, and asks a question regarding the personal attributes of the user to the second communication terminal PD2. The host computer HC can confirm that the use of the storage medium CC by the user is legal when the user operates the second communication terminal PD2 to answer the question to the host computer HC and the answer (information regarding the personal attributes) is correct. Furthermore, the second communication terminal PD2 can also transmit information selectively, to the host computer HC, regarding the type of the authentication requested by request information from the host computer HC.

To a user skilled in operating the second communication terminal (portable telephone) PD2, an authentication process using the second communication terminal PD2 is extremely simple when compared to the inputting of the signature. Furthermore, the confirmation of the second communication terminal PD2 in addition to the ID information of the storage medium CC can increase the reliability of the authentication remarkably.

When the authentication of the party in question is completed in the host computer HC, the authentication information is transmitted to the first communication terminal PD1 from the host computer HC. The notification of this authentication is performed by transmitting a specific authentication code or the like.

Furthermore, the mobile communication device (the second communication terminal) PD2 comprises a fourth transmitting means for transmitting information regarding authentication to the service device and the convenience and reliability of authentication can be increased even more through the addition, to the conditions of the authentication, of communication between the first communication terminal PD1 and the second communication terminal PD2. For example, the user ID information and other information are transmitted from the second communication terminal PD2 to the first communication terminal PD1, and the first communication terminal PD1 transmits, to the host computer HC, this information, which was sent from the second communication terminal PD2, together with the ID information of the storage medium CC. The host computer HC is provided with second storage means MEM2, where this second storage means MEM2 stores a correspondence relationship (any information regarding the communication history or the control transfer history the individual user using the card reader system CRS) between the user ID information and the second communication terminal PD2 of the user, and, based on this correspondence relationship, the host computer HC transmits the ID information of the aforementioned storage medium CC and information regarding the correspondence relationship to the second communication terminal PD2. The second communication terminal PD2 compares this information transmitted from the host computer HC with the communication history, the control transfer history were the like stored, in the first storage portion MEM1 of the second communication terminal PD2, and, if there is a match, a reply to that effect is returned to the host computer HC.

As described above, in the present embodiments, various types of authentication procedures can be used, by determining a reference for selecting the authentication procedure according to the purpose of the authentication, to achieve optimal convenience and reliability. For example, when the purpose of the authentication is to purchase a product, the authentication level can be set by the price thereof as shown in Table 2, and the authentication procedure for this can be set as shown by Table 3.

TABLE 2

Examples of the authentication levels

Authentication Level 1

The price of the product is equal to or less than a first specific value. The first specific value is, for example, ¥5,000.

Authentication Level 2

The price of the product is more than the first specific value and is equal to or less than a second specific value. The second specific value is, for example, ¥10,000.

Authentication Level 3

The price of the product is more than the second specific value.

TABLE 3

Examples of control transfer permissions

Authentication Level 1

It is unconditionally authenticated. However, confirmation after the fact is made regarding the second communication terminal.

Authentication Level 2

Authentication control company BS makes a prior confirmation regarding the second communication terminal PD2 about product purchases.

Authentication Level 3

Authentication control company BS makes a prior confirmation regarding the first communication terminal PD1 and the second communication terminal PD2 about product purchases.

That is, when the price of the product is equal to or less than the first specific value, there is unconditional authentication as authentication level 1. However, a prior confirmation is executed to the second communication terminal PD2. When the price of the product is more than the first specific value and is equal to or less than the second specific value, the authentication control company BS makes a prior confirmation about the purchase of the product regarding the second communication terminal PD2, as authentication level 2. When the price of the product is more than the second specific value, the authentication control company BS makes a prior confirmation about the purchase of the product regarding the first communication terminal PD1 and the second communication terminal PD2, as authentication level 3.

The first receiving means of the host computer HC is provided with authentication selecting means for receiving information regarding the services provided from the service device and selecting the authentication level according to this information regarding the services, enabling the authentication procedure to be changed according to the authentication level. That is, the host computer HC stores the authentication levels and the authentication procedures in the second storage means MEM2, and when collation information for requesting the authentication of the party in question and information regarding the services are received from the first communication terminal PD1 through the first receiving means, the host computer HC selects the query level according to information regarding the services, referencing the second storage means MEM2, through the use of the authentication selection means. After that, in order to perform the authentication procedure based on the authentication level, either request information for requesting information regarding authentication is sent to the mobile communication device (the second communication terminal) through the second transmitting means for a prior confirmation, or a confirmation is performed after the fact. In the case of the prior confirmation, authentication information for authenticating the party in question according to the comparison result is sent to the first communication terminal PD1 of the service device (card reader system) CRS through the first transmitting means.

When the authentication by the host computer HC is not necessary, such as in the process for authentication level 1, storing the authentication levels and the authentication procedure in the third storage means MEM3 of the first communication terminal PD1 in advance, enables the first communication terminal PD1, that is, the card reader system CRS (service device), to provide the product to the user without waiting for the reception of an authentication code from the host computer HC, if it is confirmed that the price of the product is equal to or less than the first specific value. However, a confirmation after the fact is a made regarding the second communication terminal and, after the fact, the product supplying company SP is notified to that effect via the host computer HC.

Figure 2:
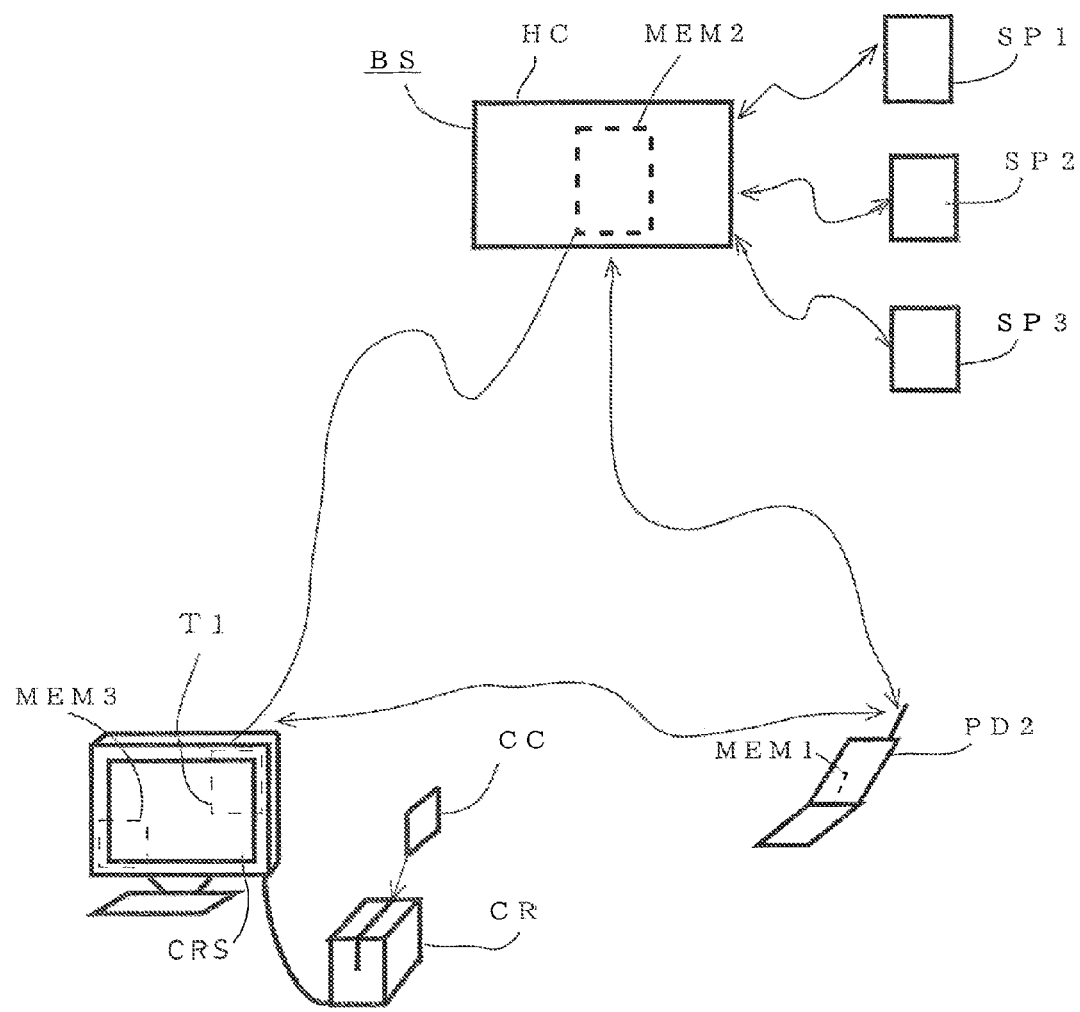
FIG. 2 is a block diagram illustrating the structure of a second embodiment of an authentication system as set forth in the present invention.

FIG. 2 illustrates a second embodiment, wherein the first communication terminal T1 of a fixed line is used in place of the first communication terminal PD1 (for mobile communication) of the first embodiment. The first communication terminal T1 is built into the card reader system CRS (service device). The other constituent components are identical to those of the first embodiment, so descriptions thereof will be omitted. The aforementioned structure enables the application of the authentication system of the present invention, even in cases where the status of the mobile communication line in the location of installation of the service device is not good.

When the first communication terminal T1 of the fixed line is used, the authentication procedure by the communication between the second communication terminal PD2 and the host computer HC can be also executed by the communication between the first communication terminal T1 and the host computer HC. This is effective when the line status of the second communication terminal is bad.

Figure 3:
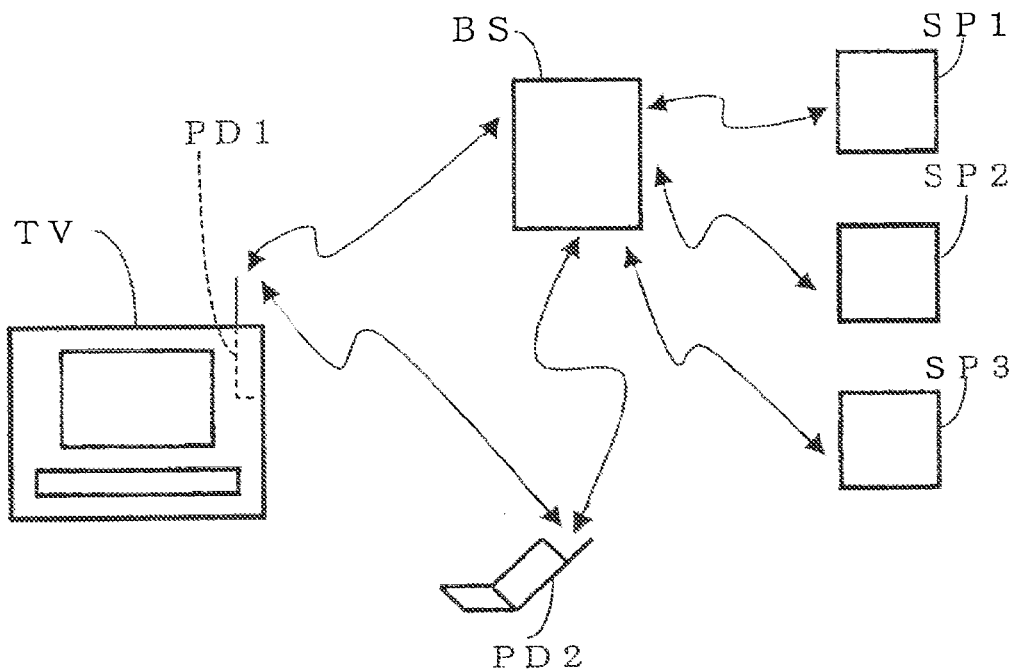
FIG. 3 is a block diagram illustrating the structure of a third embodiment of an authentication system as set forth in the present invention.

FIG. 3 illustrates a third embodiment for authentication in a television TV (service device) that can connect to the Internet. A first communication terminal PD1 (in this case, for the mobile communication) of a built-in type (embedded type) is built into the television TV, where the television TV can communicate with the authentication control company BS via the first communication terminal PD1.

The owner or the manager of the service device TV can access a variety of product supplier companies by a specific authentication procedure using the first communication terminal PD1, and the use of the video display functions and distribution functions of the television reduces limitations on the products that can be traded, remarkably invigorating economic activities.

Furthermore, if the use of television TV by a large number of unspecified customers is enabled, a broad range of customers' needs can be handled, thus invigorating economic activities even further. However, in this case, it is necessary to perform billing appropriately for customers who used the television TV (service device), and there is a concern that the authentication and the billing procedure of the individual customers may become complicated.

Additionally, in the present embodiment, when the charges for the purchase of products are to be borne by individual customers, a "control transfer mode" can be set up wherein control regarding charges is transferred to the customer's side. When the "control transfer mode" is set up, a plurality of customers perform payment processes after they have been authenticated, making it impossible for the owner or the manager of the service device to be charged.

The customer (not shown) calls a first communication terminal PD1 (used by a plurality of customers) from a second communication terminal PD2 (a mobile communication device, in this case, a portable telephone) owned by the customer, and inputs a specific code (a number, a code, or the like), so that the service device TV can be used for the purpose of the billing of the customer. Guaranteeing the customer to be a legal through the authentication of the second communication terminal PD2 in this way enables customer authentication such that the second communication terminal PD2 itself is taken as the ID information, enabling appropriate billing to be performed. Additionally, customer authentication operations are relatively simple, not compromising convenience.

At this time, information regarding billing is sent from the first communication terminal PD1 to the host computer HC of the authentication control company BS. Accordingly, regardless of whether or not the "control transfer mode" is used, information regarding billing may be transmitted together with information regarding authentication, and it is not necessary to change the form of the transmission for billing information on the service device TV.

When a specific "condition" is satisfied, the authentication control company BS permits the supply of a product by confirming the customer billing process customer. The authentication levels and conditions are the same as those of the embodiment described above.

Although the authentication levels in Table 2 are set by the prices of the product alone, they can be adjusted based on the history of products purchased from the second communication terminal PD2, as shown in Table 4.

TABLE 4

Example of adjustments of authentication levels.

Authentication Level not modified (1) When the product purchase history of the second communication terminal PD2 recorded at the authentication control company BS is less than a specific value. The specific value is set by comprehensively judging the number of purchase times and the purchase amount of money.
(2) When the product purchase history of the second communication terminal PD2 recorded in the first communication terminal PD1 is less than a specific value. As with (1), the specific value is set by comprehensively determining the number of purchases and the amount of purchases.
Authentication Level lowered by 1.

TABLE 4-continued

Example of adjustments of authentication levels.

(1) When the product purchase history of the second community terminal PD2 recorded in the authentication control company BS is more than a specific value.
(2) When the product purchase history of the second communication terminal PD2 recorded in the first communication terminal PD1 is more than a specific value.

In the evaluation of the purchase history in Table 4, if for example, the purchase amount of money of ¥100,000 is taken as the specific value of the purchase history as the condition for legal use, a comprehensive evaluation is made, such as calculating 10 purchases as being equivalent to ¥10,000 of purchases, and adding this to the purchase history, even if the purchase amount of money is less than ¥100,000.

Furthermore, the authentication level may be selected by comparing the past service provision history with the services to be provided at present, or the authentication level may be selected based on at least anyone of the cost of services, service provision area, service provision frequency and the total sum of money for the services provided.

As described above, appropriately simplifying the authentication procedure according to the authentication level can remarkably increase the convenience of the service device regarding the product provision.

Note that other parameters, for example, the geographic area of the first communication terminal, the first communication terminal itself, the type of product, or the like, may also be used for setting and adjusting the authentication levels.

Moreover, in the host computer HC, automatic analysis of product purchasing trends by the user may be used to lower the authentication level for a purchase of a product conforming to the analysis result, and to raise (increase the strictness of) the authentication level for the purchase of a product deviating from past trends.

Figure 4:
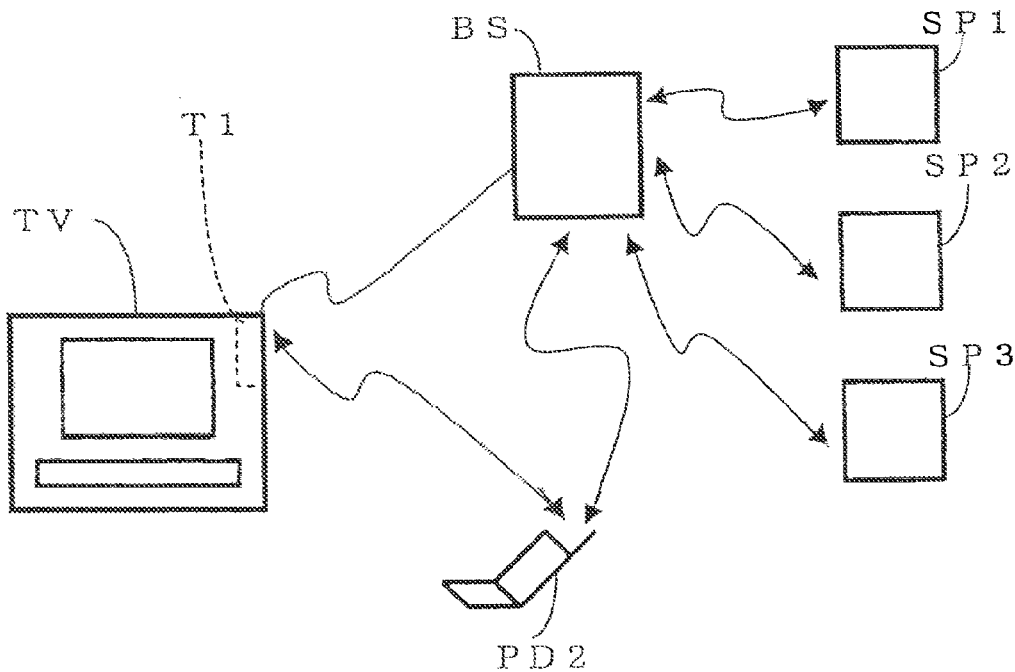
FIG. 4 is a block diagram illustrating the structure of a fourth embodiment of an authentication system as set forth in the present invention.

FIG. 4 illustrates a fourth embodiment wherein a first communication terminal T1 of a fixed line is used in place of the first communication terminal PD1 (for the mobile communication) in the third embodiment. The other constituent components are identical to those of the third embodiment, so descriptions thereof will be omitted. The aforementioned structure enables the application of the billing system of the present invention, even if the status of the mobile communication line in the location of installation of the service device is not good. Note that a structure can be used wherein the service device TV is used as the first communication terminal T1 and a telephone TV [sic] (T1) with a fixed line is used.

Figure 5:
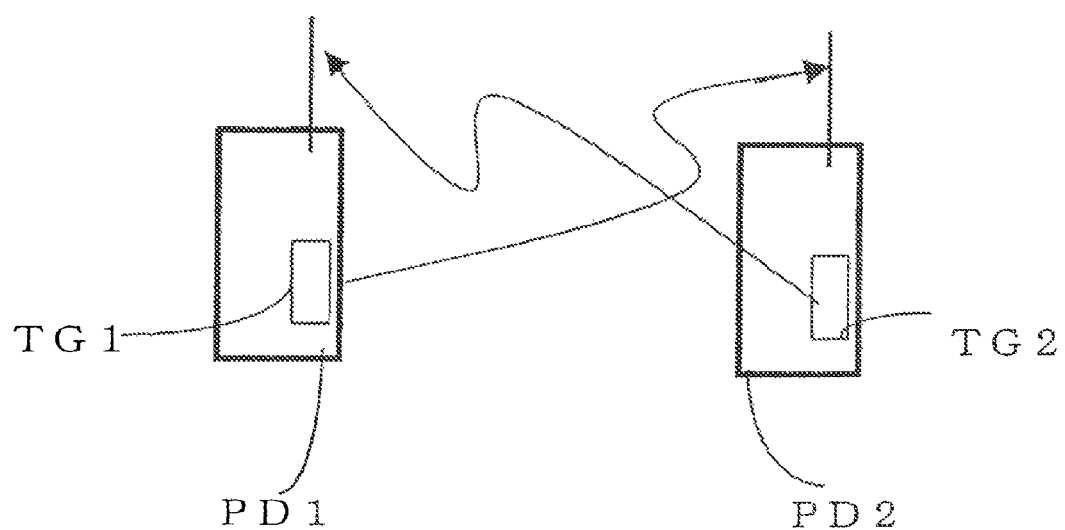
FIG. 5 is a diagram illustrating modified examples of the structures of the first and second communication terminals in the authentication system of FIG. 3.

FIG. 5 illustrates a modified example of the structure of a first communication terminal (for mobile communication) PD1 and a second mobile communication terminal (mobile communication device, portable telephone) PD2 in the third embodiment. Label tags TG1, TG2 are built into the first and second mobile communication terminals PD1, PD2, respectively, and these label tags send intrinsic signals of the first and second communication terminals PD1, PD2. The signals of label tags TG1, TG2 are received respectively by the antennas of the first and second communication terminals PD1, PD2 and, when both are detected by each other, the service device TV transmits billing information as billing for the second communication terminal PD2 to the authentication control company BS. That is, the first and second communication terminals PD1, PD2 operate as non-contact sensors and detect the electrical indexes issued by label tags TG1, TG2. The automatic detection of PD1 and PD2 by each other in this way eliminates the necessity of performing cumbersome operations such as calling the first communication terminal PD1 from the second communication terminal PD2 and inputting a code.

Obviously, radio communications by Bluetooth standards can be used in place of the communications by label tags. Additionally, the authentication control company BS may be the same as the product supplier company, simplifying the authentication system.

Figure 6:
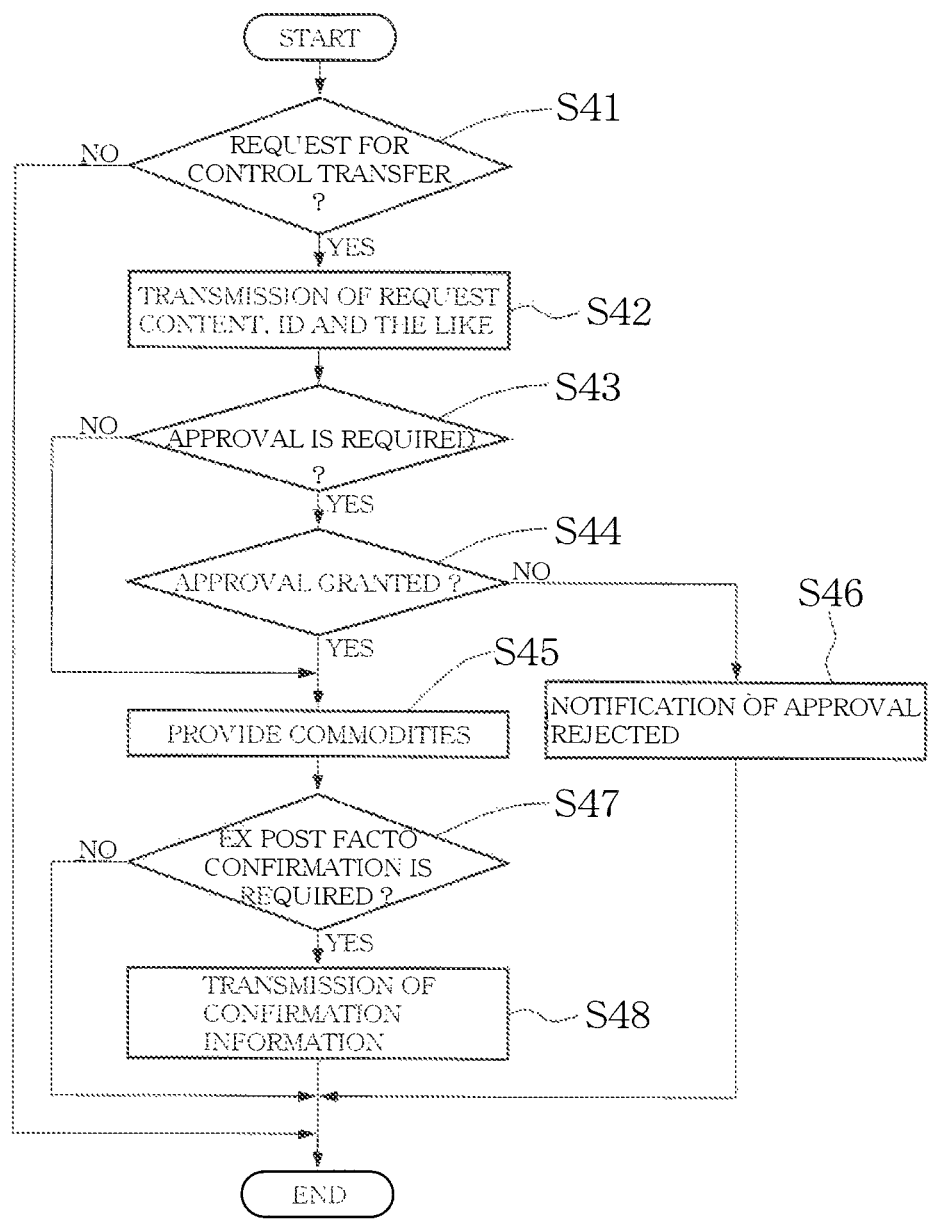
FIG. 6 is a flow chart illustrating the overall flow in an authentication system as set forth in the present invention.

FIG. 6 is a flowchart illustrating one example of the overall flow of the authentication system based on the control transfer request. Here, the adjustment of the authentication level shown in Table 4 is not performed, and a process is shown wherein only the conditions of Table 2 and Table 3 are used.

First, an operation wherein the second communication terminal PD2 calls the first communication terminal PD1, or the like, and determines whether or not a request for the control transfer has been made (Step S41), and the process is terminated if no request has been made.

If a request for control transfer has been made, the request details, namely, the product to be purchased, the prices thereof, and the like, and information regarding authentication such as the ID information regarding billing of the customer, and the like, are transmitted from the second communication terminal PD2 to the authentication control company BS (Step S42). In the first communication terminal, a determination is made, from the product prices and based on Table 2 and Table 3, whether or not the prices are of a low level not requiring an approval from the authentication control company BS, where if the approval is not required, the product is provided immediately (Step S45). If the approval is required, the product is provided (Step S45) when the approval from the authentication control company BS is granted (Step S44), and if the approval is not granted, a declined notification is provided to the second communication terminal PD2 (Step S46).

After the product is provided, a determination is made based on the Authentication Level 1 in Table 3 as to whether or not a confirmation is required after the fact (Step S47), and if confirmation is required after the fact, information regarding the purchase of the product, and the like, is sent from the authentication control company BS to the second communication terminal PD2, or the like (Step S48).

FIG. 7 is a flowchart illustrating the process flow in an authentication system that performs the adjustment of authentication levels shown in Table 4.

First, an operation wherein the second communication terminal PD2 calls the first communication terminal PD1, or the like, to determine whether or not a request for control transfer has been made (Step S51), and the process is terminated if no request has been made.

If a request for control transfer has been made, a tentative evaluation of the authentication level is made based on the prices of the product to be purchased and based on Table 2 (Step S52). Here the request details, namely, the product to be purchased, the price thereof, and the like, and information regarding authentication such as the ID information regarding billing of the customer, and the like, are transmitted from the second communication terminal PD2 to the authentication control company BS (Step 53). Next, in the first communication terminal, a determination is made based on the product price as to whether or not the product is of a low level that does not require the approval of the authentication control company BS, and if approval is not required, the product is provided immediately (Step S58). If the approval is required, it is determined whether adjustment of the authentication level is required or not based on Table 4 in the authentication control company BS, and if adjustment is required, the process returns to Step S54 after the adjustment of the authentication level. If adjustment is not required or has become unnecessary because of adjustment of the authentication level, the process advances to the decision (Step S57) as to whether the authentication is approved or not in the authentication control company BS.

If the approval is granted in Step S57, the product is provided (Step S58), but if the approval is not granted, the second communication terminal PD2 is notified that the approval is declined (Step S59).

After a product is provided, as with Authentication Level 3, a determination is made as to whether or not a confirmation is required after the fact (Step S60), and if confirmation is required after the fact, information regarding the purchase of the product, or the like, is sent from the authentication control company BS to the second communication terminal PD2 (Step S61).

Obviously, the control transfer for billing can be applied to any service device using any communication terminal other than the television TV.

The mobile communication device of the present invention is also embodied by a program that causes a computer to function as the present mobile communication device. This program may be stored on a recording medium capable of being read by a computer.

The recording medium that stores this program may be the first storage means MEM1 itself, shown in FIG. 1, or a CD-ROM, or the like, wherein a program reading unit such as the CD-ROM drive, or the like, is provided as the external storage unit, where the CD-ROM can be read thereby through the insertion of the recording medium.

Furthermore, the aforementioned recording medium may be a magnetic tape, a cassette tape, a floppy disc, a hard disc, MO/MD/DVD, or the like, or a semiconductor memory.

INDUSTRIAL APPLICABILITY

The present invention enables the provision of an authentication system that can provide an appropriate authentication process while guaranteeing the maximum convenience for the customer, when various kinds of products and services are provided, as well as a host computer, mobile communication device, program and recording medium for use in said authentication system.

What is claimed is:

1. A method comprising:
receiving, at a processing device, a first request for a transaction from a communications device, the first request comprising information of a customer to be authenticated and a price of a product or service to be purchased by the customer;
setting, using the processing device, an authentication level based on the price;
transmitting, from the processing device, a second request for identification information of the customer to a mobile communications device of the customer;
receiving, at the processing device, the identification information from the mobile communications device in response to the second request;
generating authentication information at the processing device; and
transmitting, from the processing device, the authentication information to the communications device in response to the first request.

2. The method of claim 1, wherein the setting comprises:
selecting a first authentication level in response to the price being equal to or less than a first threshold;
selecting a second authentication level in response to the price being greater than the first threshold and equal to or less than a second threshold; and
selecting a third authentication level in response to the price being greater than the second threshold.

3. The method of claim 2, further comprising:
storing a purchase history of the customer in the processing device or the communications device, wherein the purchase history comprises a frequency of purchase and a purchase amount of the product or service; and
setting the first threshold and the second threshold based on the purchase history.

4. The method of claim 2, wherein the selecting further comprises:
analyzing, using the processing device, a purchasing trend of the customer for the product or service;
increasing, using the processing device, the first threshold to be the price in response to the price approximating the purchasing trend; and
decreasing, using the processing device, the first threshold to be below the price in response to the price not approximating the purchasing trend.

5. The method of claim 4, further comprising:
unconditionally authenticating the transaction before transmitting the second request using the authentication information in response to the first authentication level being selected and transmitting the second request after completion of the transaction;
authenticating the transaction after receiving the identification information from the mobile communications device in response to the second request, in response to the second authentication level being selected by generating the authentication information based on the identification information; and
authenticating the transaction, in response to the third authentication level being selected, after:
receiving the identification information from the mobile communications device in response to the second request;
transmitting, from the processing device, a third request to the communications device for additional identification information; and
receiving the additional identification information from the communications device, the authentication information being generated based on the identification information and the additional identification information.

6. The method of claim 1, wherein the authentication level is further based on at least one of:
a location of the communications device;
a physical characteristic of the product or service; and
a frequency of purchase of the product or service.

7. A method comprising:
receiving, at a host computer, a first request for a transaction from a communications terminal, the first request comprising information of a customer to be authenticated and information identifying a parameter of the transaction;
setting an authentication level based on the parameter of the transaction;
transmitting, from the host computer, a second request for identification information of the customer to a mobile communications device of the customer;
receiving, at the host computer, the identification information from the mobile communications device in response to the second request;

generating authentication information at the host computer; and transmitting, from the host computer, the authentication information to the communications terminal in response to the first request.

8. The method of claim 7, wherein the setting comprises:

selecting a first authentication level in response to the parameter being within a first threshold;

selecting a second authentication level in response to the parameter exceeding the first threshold and being within a second threshold; and selecting a third authentication level in response to the parameter exceeding the first threshold and the second threshold.

9. The method of claim 8, further comprising:

unconditionally authenticating the transaction before transmitting the second request using the authentication information in response to the first authentication level being selected and transmitting the second request after completion, of the transaction;

authenticating the transaction after receiving the identification information from the mobile communications device in response to the second request, in response to the second authentication level is being selected by generating the authentication information based on the identification information; and authenticating the transaction, in response to the third authentication level being selected, after:

receiving the identification information from the mobile communications device in response to the second request;

transmitting, from the host computer, a third request to the communications, terminal for additional identification information; and receiving the additional identification information from the communications terminal, the authentication information being generated based on the identification information and the additional identification information.

10. The method of claim 8, wherein the parameter is one or more of:

a price of the transaction for a product or service;
a location of the service terminal;
a physical characteristic of the product or service; and
a frequency of purchase by the customer of the product or service.

11. The method of claim 10, further comprising:

storing a purchase history of the customer in the host computer or the communications terminal, wherein the purchase history comprises the frequency of purchase and the price of the transaction; and setting the first threshold and the second threshold based on the purchase history.

12. The method of claim 10, further comprising:

storing a transaction history of the customer in the host computer or the mobile communications device, wherein the transaction history comprises a location of the communications terminal; and setting the first threshold and the second threshold based on a geographic area produced from the transaction history.

13. The method of claim 10, further comprising:

storing the frequency of purchase of the product or service by the customer in the host computer or the communications terminal; and setting the first threshold and the second threshold based on the frequency of purchase of the product or service.

14. The method of claim 10, further comprising:

analyzing, using the host computer, a purchasing trend of the customer for the product or service;

increasing, using the host computer, the first threshold to be the price in response to the price approximating the purchasing trend; and decreasing, using the host computer, the first threshold to be below the price in response to the price not approximating the purchasing trend.

15. A non-transitory computer-readable storage device having instructions stored thereon that, upon execution by a host device, cause the host device to perform operations comprising:

receiving a first request for a transaction from a communications device, the first request comprising information of a customer to be authenticated and information identifying a price of a product or service to be purchased in the transaction;

setting an authentication level based on the price of the transaction;

transmitting a second request for identification information of the customer to a mobile communications device of the customer;

receiving the identification information from the mobile communications device in response to the second request;

generating authentication information at the processing device; and transmitting the authentication information to the communications device in response to the first request.

16. The non-transitory computer-readable storage device of claim 15, wherein the setting comprises:

selecting a first authentication level in response to the price being equal to or less than a first threshold;

selecting a second authentication level in response to the price being greater than the first threshold and equal to or less than a second threshold; and selecting a third authentication level in response to the price being greater than the second threshold.

17. The non-transitory computer-readable storage device of claim 16, further comprising:

unconditionally authenticating the transaction before transmitting the second request using the authentication information in response to the first authentication level being selected and transmitting the second request after completion of the transaction;

authenticating the transaction after receiving the identification information from the mobile communications device in response to the second request in response to the second authentication level being selected by generating the authentication information based on the identification information; and authenticating the transaction, in response to the third authentication level being selected, after:

receiving the identification information from the mobile communications device in response to the second request;

transmitting a third request to the communications device for additional identification information; and receiving the additional authentication information from the communications device, the authentication information being generated based on the identification information and the additional identification information.

18. The non-transitory computer-readable storage device of claim 16, further comprising:
- storing a purchase history of the customer in the host device or the communications device, wherein the purchase history comprises the frequency of purchase and the price of the transaction; and
- setting the first threshold and the second threshold based on the purchase history.

19. The non-transitory computer-readable storage device of claim 16, wherein the selecting further comprises:
- analyzing a purchasing trend of the customer for the product or service;
- increasing the first threshold to be the price in response to the price approximating the purchasing trend; and
- decreasing the first threshold to be below the price in response to the price not approximating the purchasing trend.

20. The non-transitory computer-readable storage device of claim 15, wherein the setting of the authentication level is based on one or more of:
- a location of the communications device;
- a physical characteristic of the product or service; and
- a frequency of purchase of the product or service.

* * * * *

UNITED STATES PATENT AND TRADEMARK OFFICE
CERTIFICATE OF CORRECTION

PATENT NO. : 8,442,915 B2  Page 1 of 1
APPLICATION NO. : 13/350302
DATED : May 14, 2013
INVENTOR(S) : Takatori et al.

It is certified that error appears in the above-identified patent and that said Letters Patent is hereby corrected as shown below:

In the Claims

In Column 15, Line 21, in Claim 9, delete "completion," and insert -- completion --, therefor.

In Column 15, Line 25, in Claim 9, delete "is being" and insert -- being --, therefor.

In Column 15, Line 34, in Claim 9, delete "communications," and insert -- communications --, therefor.

Signed and Sealed this
Thirteenth Day of May, 2014

Michelle K. Lee
*Deputy Director of the United States Patent and Trademark Office*